(12) United States Patent
Broehan et al.

(10) Patent No.: US 6,466,876 B1
(45) Date of Patent: Oct. 15, 2002

(54) MEASURING DEVICE FOR ELECTRICALLY DECOUPLED FUNCTION TESTING OF WORKING SYSTEMS

(75) Inventors: Dirk Broehan, Waiblingen; Lothar Walter, Ostfildern; Juergen Schenk, Albershauseh, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/423,748
(22) PCT Filed: May 13, 1998
(86) PCT No.: PCT/EP98/02794
§ 371 (c)(1), (2), (4) Date: Feb. 11, 2000
(87) PCT Pub. No.: WO98/52062
PCT Pub. Date: Nov. 19, 1998

(30) Foreign Application Priority Data

May 15, 1997 (DE) .......................................... 197 20 379
Jan. 23, 1998 (DE) .......................................... 198 02 487

(51) Int. Cl.[7] .............................................. G01R 13/42
(52) U.S. Cl. ..................................... 702/35; 174/152 S
(58) Field of Search .......................... 702/35; 313/11.5, 313/126; 174/439, 315, 355 M, 775, 138 S, 152 S; 439/890, 893

(56) References Cited

U.S. PATENT DOCUMENTS

| | | | | |
|---|---|---|---|---|
| 4,090,125 A | * | 5/1978 | Warner | 324/15 |
| 4,227,402 A | * | 10/1980 | Dooley et al. | 73/115 |
| 4,452,072 A | * | 6/1984 | Damson et al. | 73/116 |
| 4,602,507 A | * | 7/1986 | Hayes | 73/117.3 |
| 4,917,810 A | * | 4/1990 | Tsunooka et al. | 252/62.9 |
| 5,111,790 A | * | 5/1992 | Grandy | 123/425 |
| 5,415,148 A | * | 5/1995 | Kanehiro et al. | 123/630 |
| 5,600,239 A | * | 2/1997 | Hathaway et al. | 324/209 |
| 6,145,491 A | * | 11/2000 | Wilsternann et al. | 126/406.35 |

FOREIGN PATENT DOCUMENTS

| | | |
|---|---|---|
| DE | 2028504 A | 3/1980 |
| EP | 0715160 A2 | 6/1996 |

OTHER PUBLICATIONS

International Search Report, Sep. 15, 1998.

* cited by examiner

Primary Examiner—Marc S. Hoff
Assistant Examiner—Edward Raymond
(74) Attorney, Agent, or Firm—Crowell & Moring LLP

(57) ABSTRACT

In a measuring arrangement for the electrically uncoupled function testing of systems with a current-carrying conductor, an electromechanical transducer in the form of a piezoceramic element is assigned to the conductor. The conductor can be an ignition coil of a vehicle ignition system.

20 Claims, 2 Drawing Sheets

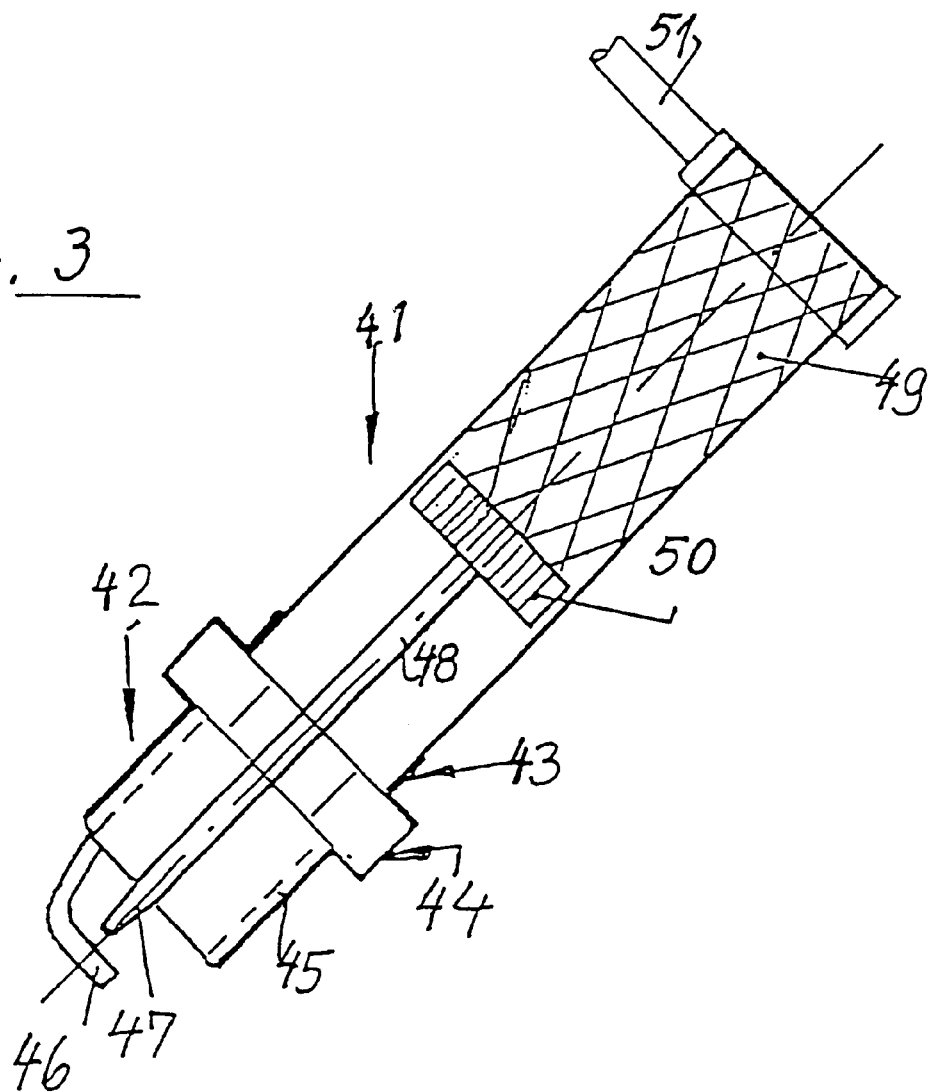

MEASURING DEVICE FOR ELECTRICALLY DECOUPLED FUNCTION TESTING OF WORKING SYSTEMS

BACKGROUND

The invention relates to a measuring arrangement for the electrically uncoupled function testing of operating systems which comprise a current-carrying conductor.

For the electrically uncoupled function testing of operating loudspeakers, a measuring arrangement is known (DE-German Book: H. Sahm, "HiFi Loudspeakers", 3rd Edition, Franzis Publishers, München, 1985, Chapter 29: "Loudspeaker Measurements"), in the case of which the oscillation coil pertaining to the loudspeaker forms a current-carrying conductor, to which a microphone is assigned as the sensor, which, as an electromechanical transducer, senses the oscillations caused by the oscillation coil as signals which, by way of an amplifier, are fed to an analysis unit, such as a frequency analyzer, a level recorder or the like.

In addition, a system is known (German Patent Document DE 4308796 C2) for monitoring and diagnosing mechanical systems, thus, for example, for a damage diagnosis in the case of machines, such as the roller bearing diagnosis, in the case of which the oscillations caused by mechanical defects, such as bearing irregularities or bearing damages, are sensed and processed. The starting points are always oscillations triggered by mechanical situations which oscillations are detected and evaluated by analyzing the envelope curve. Periodic signals are therefore analyzed.

For the potential-free monitoring of the ignition systems of internal-combustion engines, capacitively or inductively operating measuring systems are also known from practice. These systems operate current-proportionally (inductive primary detectors) or voltage-proportionally (capacitive primary detectors), and phase shifts exist in the case of the current-proportionally operating inductive as well as in the case of the voltage-proportionally operating capacitive primary detectors. In addition, capacitive primary detectors (high pass) do not detect low frequencies and inductive primary detectors (low pass) do not detect high frequencies so that the achievable results also do not supply any information on the effective output.

It is an object of the invention to monitor and diagnose systems comprising current-carrying conductors, specifically including the detection of one-time, periodic or non-periodic events and the obtaining of one-time periodic or non-periodic control quantities or automatic control quantities for the respective system as such or for the system and the arrangement, machine or device pertaining thereto.

This object is achieved by providing a measuring arrangement for the electrically uncoupled function testing of operating systems which comprise a current-carrying conductor and in the case of which an electromechanical transducer is assigned to the conductor in a direct mechanical coupling by way of a substantially incompressible medium, which transducer detects oscillations caused by the conductor, and the detected oscillations being supplied to at least one analyzing unit by way of an amplifier.

By means of the invention, for systems as such, which comprise an electric conductor as well as for arrangements, machines and/or devices equipped with such systems and/or interacting with such systems, an electrically uncoupled and thus galvanically separate detection of signals for a monitoring, a diagnosis, a control and an automatic control is permitted, in the case of which the signal detection takes place effective-output-proportionally and without phase shift over the whole frequency range, that is, also for very high frequencies. By way of the electromechanical transducer, the oscillations of the electric conductor are detected in this case in a potential-free manner over the whole operating range, the obtained signals being proportional to the energy course in the electric conductor. Since the correlation is identical with respect to the time and phase and proportional with respect to the amplitude, the mechanical energy course detected by way of the oscillations is also comparable to the electric energy course in the electric conductor. The detection of the energy course allows an evaluation of the system and conclusions on its primary as well as secondary functions. In addition, the measuring arrangement according to the invention permits comparisons between several conductors of a system among one another so that whole systems can be monitored, and this can take place with respect to constructional characteristics, such as bondings and connection devices as well as with respect to their functional sequences.

Because of these characteristics, but particularly also because of its immunity to interferences and its simplicity, the measuring arrangement according to the invention is suitable particularly for a use in motor vehicles, and here particularly for the use in connection with internal combustion engines,; thus, mainly for the electrically uncoupled function testing of an operating ignition coil of an ignition system; in the sense of the invention, the electric conductor being formed by the ignition coil, for evaluating the ignition system as a whole as well as its primary and secondary ignition functions. By comparisons of the ignition coils of the ignition system, the system as a whole can be monitored, and the ignition coils, the bondings and the connection devices as well as the spark plugs can be evaluated in their functionality, specifically in an interaction with the combustion. Thus, ignition failures can be detected in order to possibly switch off the fuel injection and prevent damage to the catalyst.

Although the use of the measuring arrangement in conjunction with ignition systems of internal-combustion engines represents a preferred use in connection with motor vehicles, within the scope of the invention, particularly also in combination with the use of the measuring arrangement with respect to ignition systems of internal-combustion engines, additional vehicle-related applications may be particularly expedient. Thus, the measuring arrangement according to the invention is suitable for applications in connection with electrically controlled and/or operated injection valves, particularly electromagnetically operated injection valves, such as pump - nozzle elements or injectors of common rail injection systems. Corresponding applications exist within the scope of the invention also for electromagnetic valve timing gears or electrically operated or electrically controlled actuators used for different purposes. In addition, the measuring arrangement according to the invention can be used in connection with relays, deflection systems, such as tubes or elementary particle accelerators, electric motors, generators, dynamos and/or transformers, which have electric conductors, for example, in the form of coils, so that, particularly in connection with vehicles in which electric operating and adjusting devices are increasingly used, measuring arrangements can be applied which operate according to the same principle.

Within the scope of the invention, strain gauges, piezoresistive transducers or piezoceramic transducers may preferably be used as electromechanical transducers.

A particularly expedient further development of the electromechanical transducer is represented by a piezoceramic element constructed as a knock sensor, as available as a tested structural member and already used particularly also in automobile construction in industrial scale manufacturing, and thus available at reasonable cost. Relative to the above-addressed application of the measuring arrangement in connection with ignition coils, the electromechanical transducer can be arranged, for example, as the further development as the knock sensor, externally with respect to the ignition coil or may be combined as a structural element with the ignition coil or may be integrated into the latter. The direct mechanical coupling can be implemented in a simple manner by way of a medium which essentially cannot be compressed, thus preferably an at least almost rigid coupling.

Since the measuring arrangement according to the invention relative to the described preferred use in connection with ignition systems of internal-combustion engines is independent of the type of the used ignition technique, the integration of the electromechanical transducer in the form of a knock sensor into the ignition coils also offers the best premises for applying, as the result of the signal analysis in the engine timing unit, the proportionality factor required for the ignition or combustion voltage in the engine timing unit. When energy-controlled ignition systems are used which, as the result of the special analysis of the ion current, supply information on knocking, combustion pressure and/or also combustion failures, the measuring arrangement also offers the possibility of producing in a potential-free manner, a reference to the ion current and, as a result, testing and analyzing the combustion quality, whereby additional information becomes available for controlling and/or automatically controlling the internal-combustion engine.

An embodiment, which in this context supplies particularly expedient and extensive information, in connection with internal-combustion engines of motor vehicles consists of assigning to the ignition unit, in an assignment to the ignition coil, an electromechanical transducer in the form of a knock sensor and additionally mechanically coupling it also with the spark plug so that, by way of the knock sensor, the sound signals of the ignition coil can be detected in a potential-free manner over the whole ignition range, specifically proportionally to the energy course in the ignition coil, as well as the sound pressure signals of the combustion. Such a combined usage is economically particularly advantageous and, in addition, permits conclusions on the mechanical condition of the internal-combustion engine as a whole while directly detecting the combustion sequences, so that combustion failures as well as early ignitions (knocking) can be immediately detected and corresponding control measures, for example, switching off the fuel injection for protecting the catalyst or adjusting the ignition in the late direction, can be initiated.

The example of an ignition unit with the ignition coil and the spark plug illustrates in a generalizing manner that the electromechanical transducer as the vibration transducer can definitely be arranged in different positions; thus, for example, between the ignition coil and the spark plug, in the ignition coil or, relative to the ignition coil, opposite the spark plug.

In the following, the invention will be explained in detail by means of embodiments, in which the measuring arrangement is illustrated as an example in its use in ignition systems of internal-combustion engines.

Other objects, advantages and novel features of the present invention will become apparent from the following detailed description of the invention when considered in conjunction with the accompanying drawings.

BRIEF DESCRIPTION OF THE DRAWINGS

FIG. 3 is a very schematic representation of a spark plug of an internal-combustion engine with an ignition coil assigned to a constructional unit and an electromechanical transducer which is mechanically coupled directly with the ignition coil and the spark plug.

DETAILED DESCRIPTION OF THE DRAWINGS

Figure 1:
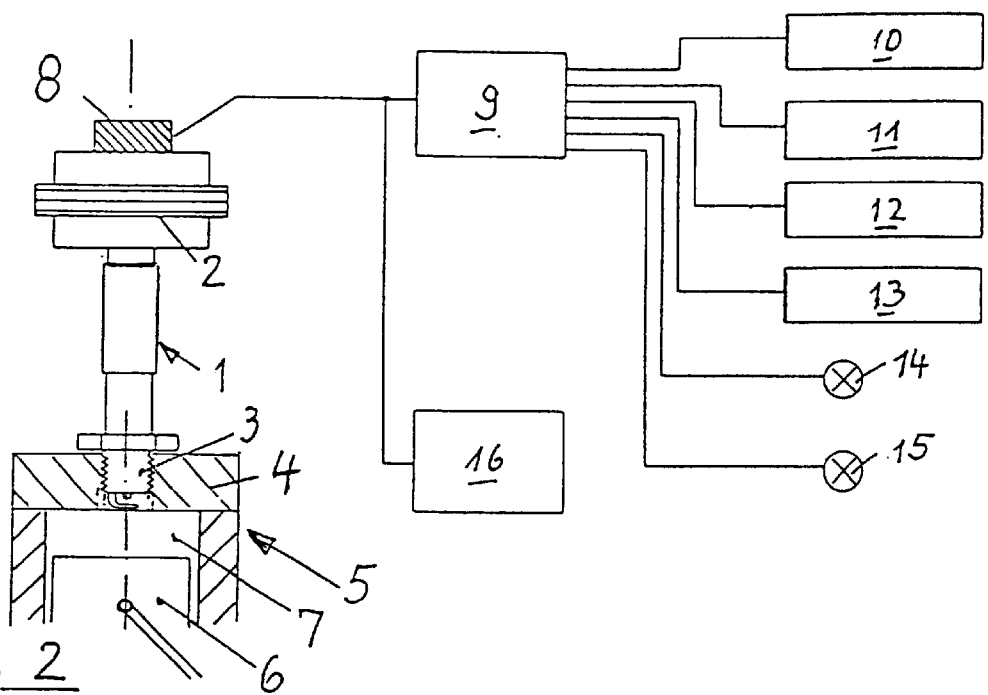
FIG. 1 is a schematic view of a measuring arrangement in which the piezoceramic element used as the electromechanical transducer is assigned externally to the ignition coil of an ignition system of an internal-combustion engine.
Figure 2:
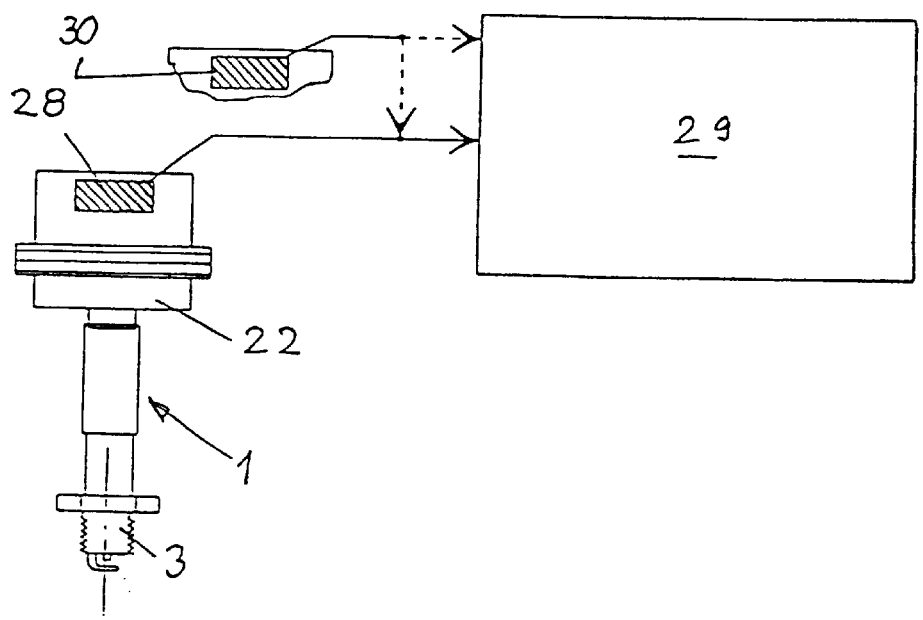
FIG. 2 is a view of an arrangement similar to that according to FIG. 1, in which the piezoceramic element used as an electromechanical transducer is combined in an integrated construction with the ignition coil of an ignition system of an internal-combustion engine.

FIGS. 1 and 2 each illustrate schematic arrangements of an ignition system of an internal-combustion engine having a spark plug 1 which is combined with a pertaining single-spark ignition coil 2 and its connection devices to form a constructional unit. By way of its threaded portion 3, the spark plug 1 is screwed into the cylinder head 4 of the schematically illustrated internal-combustion engine 5, whose piston 6 bounds the volume-changeable combustion space 7 to which the spark plug 1 leads out. The additional operating parts of the internal-combustion engine and of the ignition system are not shown; neither are the charge cycle ducts, which lead out to the combustion space 7 of the internal-combustion engine 5, and the charge cycle control elements.

In the embodiment according to FIG. 1, an electromechanical transducer in the form of a piezoceramic element 8 is assigned to the ignition coil 2 for detecting the oscillations originating from the ignition coil 2 as the electric conductor, which piezoceramic element 8, in the further development according to FIG. 1, rests on the exterior side against the ignition coil 2; thus, is externally fastened to the ignition coil 2 in a direct mechanical coupling.

A knock sensor is used as a piezoceramic element 8, by way of which the sound signals of the ignition coil 2 are detected as oscillations and are supplied to an amplifier 9 of an analyzing unit with or without a filter, which are symbolically combined here with the amplifier 9. In the embodiment shown, visual digital—displays, which are symbolically shown here and have the reference numbers 10 to 15, are arranged behind the amplifier 9 of the analyzing unit with or without a filter of the measuring arrangement, which permits an electrically uncoupled function testing of the ignition system during the operation of the internal-combustion engine, the display 10 indicating, for example, the closing time; the display 11 indicating the combustion duration; the display 12 indicating the ignition voltage; the display 13 indicating the combustion voltage, and 14 and 15 symbolizing displays in the form of control lights, of which the display 14 indicates, for example, whether the ignition spark is all right, and the display 15 indicates defects in the ignition. The routes leading in the connection from the piezoceramic element 8 to the individual elements of the measuring arrangement have no reference numbers.

FIG. 1 also shows that in parallel to—or instead of the above-described display of function data—an analogous analysis is also possible; for example, by viewing by means of a display device (oscilloscope) 16 which, in the simplest case, is connected with the piezoceramic element 8 or, which is not shown here, with the amplifier 9. The display device 19 supplies, for example, information concerning the operating condition of the ignition system. The corresponding signals—which can be detected in a potential-free manner along the whole ignition range—are proportional to the energy course in the ignition coil 2. The correlation of the voltage position at the secondary circuit of the ignition coil 2 and the voltage position on the piezoceramic element 8, with respect to the time and phase, is identical and with respect to the amplitude, is proportional such that the energy course detected by way of the oscillation on the piezoceramic element 8 can be compared with the electric energy course in the ignition coil 2. Relative to an ignition system with a multiple arrangement of spark plugs 1, possibly in connection with a multi-cylinder internal-combustion engine, by means of the detection of the energy course in the ignition coil 2 by way of the piezoceramic element 8 as an electromechanical transducer, conclusions can be drawn with respect to the primary and secondary ignition function, and analyses can also take place which, as the result of the comparison of the ignition coils among one another, indicate effects on the whole ignition system.

FIG. 2 shows an arrangement whose basic construction largely corresponds to that of FIG. 1. Deviating from the embodiment according to FIG. 1, whose reference numbers are used if they coincide, here, the piezoceramic element 28 as the electromechanical transducer in the form of a knock sensor is integrated in the single-spark ignition coil 22. The oscillations detected by way of the piezoceramic element 28 are then supplied to the control 29 of the internal-combustion engine 5, in which a direct ignition diagnosis is carried out with a conversion into corresponding control and/or automatic control values for the internal-combustion engine. The proportionality factor required for the ignition voltage and combustion voltage can be applied by the analysis in the control unit and/or the automatic control unit.

In FIG. 2, the partial representation of another single-spark ignition coil 30 additionally shows that the signals, which are detected on the ignition coils provided on the spark plugs assigned to the cylinders of a multi-cylinder internal-combustion engine, can each be separately supplied to the control unit of the internal-combustion engine, or combined as a summation signal from which the values which are in each case of interest can be extracted by way of corresponding observation windows.

FIG. 3 illustrates an ignition unit 41 which, in a constructionally combined manner, comprises a spark plug 42 and an ignition coil 49, in which case the housing 43 of the ignition unit, adjoining the nut portion 44 of the spark plug 42, conventionally has a thread portion 45 on which the ground electrode 46 of the spark plug 42 is mounted. The center electrode 47 is provided opposite the ground electrode 46, which center electrode 47, in a manner not shown in detail, is insulated with respect to the spark plug shell, penetrates the latter, and is preferably conductively connected with a connecting bolt 48. In the combination according to the invention of the spark plug 42 and the ignition coil 49 for forming an ignition unit 1, the connecting bolt 48 is mechanically axially supported against the piezoceramic element 50 as the electromechanical transducer, and is therefore coupled in a directly mechanical manner. In this case, the piezoceramic element 50 is situated in the transition to the ignition coil 49 and is coupled with it also in a directly mechanical manner. At the end of the ignition coil 49 situated away from the spark plug 42, a connection 51 is symbolically provided for line connections which are not shown here in detail.

Reference is made to the above explanations concerning the operation of the piezoceramic element 50 as an electromechanical transducer in the interaction with the ignition coil 49. In addition, in the provided arrangement, the piezoceramic element 50 is connected by way of the connection bolt 48 mechanically by way of the spark plug 42 with the combustion space, the connection of the piezoceramic element 50 with the center electrode 47 and the insulation body enclosing the latter taking place so that the combustion space pressure is transmitted directly mechanically by way of the spark plug 42 to the piezoceramic element 50, which supplies a corresponding sound pressure signal proportional the combustion space pressure. As the result of the arrangement of the electrode and its further development, the intensities can also be influenced by means of which the pressure wave acts upon the oscillation detector, thus the piezoceramic element (50) (damping effect).

Thus, by means of the invention, supplementing the conclusions with respect to the primary and secondary ignition function which are derived from the sound signals of the spark plug 49, as the result of the direct detection of the combustion space pressure, additional information can be obtained concerning the mechanical condition of the internal-combustion engine, in which case, by way of the combustion pressure, knocking conditions and combustion failures can also be detected directly.

The ignition unit 51 according to FIG. 3 equipped according to the invention therefore permits to a very extensive degree conclusions with respect to the combustion sequences and the mechanical condition of the internal-combustion engine with corresponding control possibilities as well as additional possibilities for the diagnosis of the internal-combustion engine condition.

The direct mechanical coupling of the electric conductor, which in the embodiment according to FIG. 3, is formed, for example, by the ignition coil 49, with the electromechanical transducer, in the embodiment according to FIG. 3, the piezoceramic element 50, according to the invention, takes place by way of a medium which can essentially not be compressed, the medium which cannot be compressed in the embodiment shown being formed by a solid body because a direct connection is provided, but, according to the invention, may also be formed by a liquid which, in contrast to gases, has a corresponding behavior.

In the embodiments shown, piezoceramic elements are always illustrated as the electromechanical transducers. Although, particularly as a further development as knock sensors, these are particularly advantageous and expedient within the scope of the invention, deviating from knock sensors, other piezoresistive or piezoceramic detectors or strain gauges can also be used as electromechanical transducers within the scope of the invention.

Also, the invention is not limited by a concentration of the embodiments on ignition systems of internal-combustion engines, but, within the scope of the invention, other systems with a current-carrying conductor can be sensed by way of the measuring arrangement according to the invention, such as injection valves, which are electrically controlled and/or operated; relays, electromagnetic valve timing gears, deflection systems (tubes, elementary particle accelerators), electric motors, generators, dynamos, and/or transformers, electric conductors which carry current during the operation existing in the form of windings, coils or the like.

Relative to FIG. 3, the position of the electromechanical transducer in the form of the piezoceramic element 50 and/or its connection to the combustion space can also influence the intensity of the effect of the pressure waves originating from the combustion space on the electromechanical transducer. Under this aspect, among others, according to the invention, the transducer in the form of the piezoceramic element can be arranged between the spark plug and the ignition coil, in the ignition coil or on the side of the ignition coil facing away from the spark plug. In addition, according to the invention, the electromechanical transducer may also be integrated in the connecting bolt or form a portion thereof. It is also advantageous according to the invention to ensure a prestressed connection between the connecting bolt and the electromechanical transducer in order to always ensure a positive loaded connection. Also, according to the invention, the combustion-space-side detection of the pressure waves can take place in a damped manner, either because of the fact that the pressure wave detector in the form of, for example, the center electrode 47 is shielded by means of the ground electrode 46, or that a damping element is assigned to the connecting bolt as an element which absorbs and/or transmits pressure waves.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Measuring arrangement for electrically uncoupled function testing of operating systems comprising a current-carrying conductor and an electromechanical transducer assigned to the conductor in a direct mechanical coupling by way of a substantially incompressible medium, said transducer detecting oscillations caused by the conductor, and the detected oscillations being supplied to at least one analyzing unit by way of an amplifier.

2. Measuring arrangement according to claim 1, wherein the electromechanical transducer is formed by a strain gauge system.

3. Measuring arrangement according to claim 1, wherein the electromechanical transducer is formed by a piezoceramic element.

4. Measuring arrangement according to claim 3, wherein the piezoceramic element is a knock sensor.

5. Measuring arrangement according to claim 1, wherein the current-carrying conductor is formed by an ignition coil of an ignition system of an internal-combustion engine.

6. Measuring arrangement according to claim 5, the ignition coil forms a constructional ignition unit with a spark plug of an ignition system of an internal-combustion engine.

7. Measuring arrangement according to claim 5 wherein the electromechanical transducer connected with the ignition coil as the current-carrying conductor in a direct mechanical coupling is additionally coupled with a portion of the spark plug assigned to a combustion space of the internal-combustion engine as a sensor for combustion space pressure.

8. Measuring arrangement according to claim 7, wherein the portion of the spark plug used as the sensor for the combustion space pressure is formed by an electrode of the spark plug which is insulated with respect to a spark plug shell, said electrode being supported against the electromechanical transducer.

9. Measuring arrangement according to claim 8, wherein the electrode is insulated with respect to the spark plug shell and is supported by way of a connecting bolt against the electromechanical transducer.

10. Measuring arrangement according to claim 1, wherein at least one analyzing unit is connected in front of display instruments.

11. Measuring arrangement according to claim 1, wherein at least one analyzing unit is assigned to a control of an internal-combustion engine such that signals processed by way of the analyzing unit with or without filters can be converted into control signals for the internal-combustion engine.

12. Measuring arrangement according to claim 1, wherein the current-carrying conductor is a component of a control or operating system of one of injection valves, an electromagnetic operating device of injection valves, pump-nozzle elements, injectors, and the like.

13. Measuring arrangement according to claim 1, wherein the current-carrying conductor is a component of one of an electromagnetic valve timing gear and an electromagnetic operating device for an electromagnetic valve timing gear.

14. Measuring arrangement according to claim 1, wherein the current-carrying conductor is a component of one of a relay, deflecting systems, such as tubes or elementary particle accelerators, electric motors, generators, dynamos and transformers.

15. Measuring arrangement according to claim 3, wherein the current-carrying conductor is formed by an ignition coil of an ignition system of an internal-combustion engine.

16. Measuring arrangement according to claim 4, wherein the current-carrying conductor is formed by an ignition coil of an ignition system of an internal-combustion engine.

17. Measuring arrangement according to claim 9, wherein the electromechanical transducer is formed by a piezoceramic element.

18. Measuring arrangement according to claim 17, wherein the piezoceramic element is a knock sensor.

19. Measuring arrangement according to claim 10, wherein at least one analyzing unit is assigned to a control of an internal-combustion engine such that signals processed by way of the analyzing unit with or without filters can be converted into control signals for the internal-combustion engine.

20. Measuring arrangement according to claim 19, wherein the current-carrying conductor is formed by an ignition coil of an ignition system of an internal-combustion engine.

* * * * *